(12) United States Patent
Miller et al.

(10) Patent No.: US 6,389,590 B1
(45) Date of Patent: May 14, 2002

(54) INDEFINITE-SIZE VARIABLES WITHIN AN INTERMEDIATE LANGUAGE

(75) Inventors: James S. Miller, Bellevue; Peter Kukol, Monroe; Vance P. Morrison, Kirkland, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/337,814

(22) Filed: Jun. 22, 1999

(51) Int. Cl.$^7$ ................................................. G06F 9/45
(52) U.S. Cl. ....................................... 717/140; 717/146
(58) Field of Search ............................... 717/5, 7, 140, 717/146

(56) References Cited

U.S. PATENT DOCUMENTS

| | | | |
|---|---|---|---|
| 4,667,290 A | 5/1987 | Goss et al. ................. | 717/7 |
| 5,339,419 A | * 8/1994 | Chan et al. ................. | 717/7 |
| 5,396,631 A | * 3/1995 | Hayashi et al. ............. | 717/7 |
| 5,548,761 A | * 8/1996 | Balasundaram et al. ..... | 717/7 |

FOREIGN PATENT DOCUMENTS

EP   0 463 583 A   1/1992

OTHER PUBLICATIONS

Shao et al., Implementing Typed Intermediate Languages, Apr. 1998, ACM, p. 313–323.*

Martin Richards and Colin Whitby–Strevens, BCPL: The Language and Its Compiler, pp. 124–136 (1980).

Peter H. Salus, Handbook of Programming Languages, vol. II: Imperative Programming Languages, Chapter 4: Intermediate Languages (by Ron K. Cytron) (May 1998).

Backhouse, Program construction and verification (1986), Prentice–Hall Intl, Chp 4, sec 4.4, "Sorting Problems," p. 189, 17 through p. 194, I 22.

H C Gyllstrom et al, The Universal Compiling System, Sigplan Notices, vol. 14, No. 12, Dec. 1997, pp. 64–70, abstract.

"Verification of ANDF components", Frederic Broustaut et al., 1995 ACM, IR'95, 1/1995, San Francisco, CA, USA, pp. 1–8.

* cited by examiner

*Primary Examiner*—Tuan Q. Dam
*Assistant Examiner*—John Q. Chavis
(74) *Attorney, Agent, or Firm*—Banner & Witcoff Ltd.

(57) ABSTRACT

Indefinite-size variables within an intermediate language are disclosed. In one embodiment, a computer-implemented method first inputs intermediate language code having a size-indefinite variable. The method generates native code based on the intermediate-language code. This includes generating a size-definite variable corresponding to the size-indefinite variable, according to a machine-specific criteria. The method then outputs the native code. In one embodiment, outputting the native code includes executing the native code.

14 Claims, 5 Drawing Sheets

INDEFINITE-SIZE VARIABLES WITHIN AN INTERMEDIATE LANGUAGE

FIELD OF THE INVENTION

This invention relates generally to intermediate languages, and more particularly to indefinite-size variables within such intermediate languages.

BACKGROUND OF THE INVENTION

Intermediate language-type models for programming languages have become increasingly popular. In an intermediate language model, a source code is generally compiled into a desirably substantially platform-independent intermediate language. When the code is desired to be run on a particular platform, an execution engine on that platform then interprets or compiles the intermediate language to native code understandable by the platform. Examples of systems that use intermediate languages include the Java virtual machine.

An advantage of intermediate-language code is thus its platform portability. Desirably, once a source code has been compiled into an intermediate-language code, this latter code can then be distributed to different platforms, such as those having different underlying processors, such as x86-type, PowerPC, and DEC Alpha processors, and the code will be properly compiled or interpreted to native code and executed. In other words, the source code of a program desirably does not need to be recompiled for every type of platform on which the program is intended to be run.

However, current intermediate-language models do not provide for optimal scalability among different platforms. Scalability in this context generally refers to the ability of a program to run well on both low-end and high-end platforms. A low-end platform may have a 32-bit architecture, which means that the processor can process data up to 32-bits in width (that is, a "word" of data 32-bits long) at one time. Conversely, a high-end platform may have a 64-bit architecture, which means that the processor can process data up to 64-bits in width at one time.

For example, within the prior art, a source code may be compiled into an intermediate-language code that automatically specifies 32-bit variables, such as variables having an unsigned (viz., pointer) data type. For a low-end platform having a 32-bit architecture, this is not an issue, since the full (32-bit) processing capability of the architecture is utilized. However, for high-end platforms having a 64-bit architecture, specification of only 32-bit variables means that the full (64-bit) processing capability of the architecture is underutilized.

The full capability of a 64-bit architecture may thus not be usable by an intermediate-language code in which the size of variables (32-bit, 64-bit, etc.) is automatically fixed when compiling source code into the intermediate-language code, or when the source code itself is written. To use the full capability, the source code may either have to be recompiled into intermediate-language code, or, worse, the source code may have to be rewritten to specify 64-bit variables instead of 32-bit variables. However, specifying 64-bit variables a priori, regardless of the desired target platform, is also not a workable solution: such resulting intermediate-language code would not run on 32-bit platforms, for example, since they are not able to handle 64-bit variables.

It is noted that this is just one example of data types and data type size. Other data types include integer, floating point (i.e., real number), etc. Data types may also be of other sizes besides 32-bit and 64-bit, including 8-bit and 16-bit, especially when dealing with older processors, as well as 128-bit, 256-bit, etc., when dealing with more state-of-the-art processors. In general, the term data type as used herein refers to any type of data type, and data type size refers to any size of n bits, where n is not limited.

The issue of data types and data type sizes is implicitly handled in a disadvantageous manner by various intermediate languages. Two other types of intermediate language include o-code, generated by compilers from source code written in BCPL (the "B Computer Programming Language," a predecessor to the commonly used C programming language), and p-code, generated by compilers from source code written in Pascal. O-code has no support for data types. That is, o-code does not distinguish between integers, floating points, unsigned integers (i.e. pointers), etc. Furthermore, all variables, regardless of their data type, are of the same size. P-code, allows different data types, but does not provide for differently sized data types.

The inability to size the data types of variables in accordance with the platform on which an intermediate-language code is to be run thus significantly impairs the scalability of intermediate-language code. As a result, the usefulness of intermediate-language code is decreased, since intermediate-language code is generally used in the first place for more portability as compared to native code that is compiled directly from source code. For these and other reasons, there is a need for the present invention.

SUMMARY OF THE INVENTION

The invention relates to indefinite-size variables within an intermediate language. In one embodiment, a computer-implemented method first inputs intermediate language code having a size-indefinite variable. The method generates native code based on the intermediate-language code—including generating a size-definite variable corresponding to the size-indefinite variable, according to a machine-specific criteria. The method then outputs the native code; for example, in one embodiment, the method executes the native code.

As an example, in one embodiment, a program already in intermediate language code may have a variable that is a pointer (viz., having an unsigned data type), and that is size-indefinite. A pointer is a type of variable that references a memory cell within a range of memory cells. The range of memory cells that can be referenced by the pointer is limited by the size of the pointer. A 32-bit pointer can reference $2^{32}$ cells, while a 64-bit pointer can reference $2^{64}$ cells. 32-bit, 64-bit, etc., pointers are specifically referred to as size-definite pointers, in that they have a definite size. Thus, a size-indefinite pointer is a pointer that does not have a definite size. That is, the variable is not specified in the intermediate language code itself as being 32-bits in size, 64-bits in size, etc.

When the intermediate language code is transformed to native code, the underlying platform on which the native code is to be run, for example, then dictates the size of this pointer. In the case of a 32-bit architecture, the size-indefinite pointer can be transformed to a 32-bit pointer, while in the case of a 64-bit architecture, the size-indefinite pointer can be transformed to a 64-bit pointer. This means that a single intermediate language code is able to run well on both 32-bit and 64-bit architectures.

Embodiments of the invention therefore provide for advantages over the prior art. Intermediate language code of a program according to an embodiment of the invention can be scaled to both low-end and high-end platforms, without having to have the source code of the program recompiled into intermediate language code or rewritten. That is, depending on the machine-specific criteria of the platform on which the program is to be run, size-indefinite variables are transformed into size-definite variables appropriate to the platform on which the program is to be run.

The invention includes computer-implemented methods, machine-readable media, computerized systems, devices and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
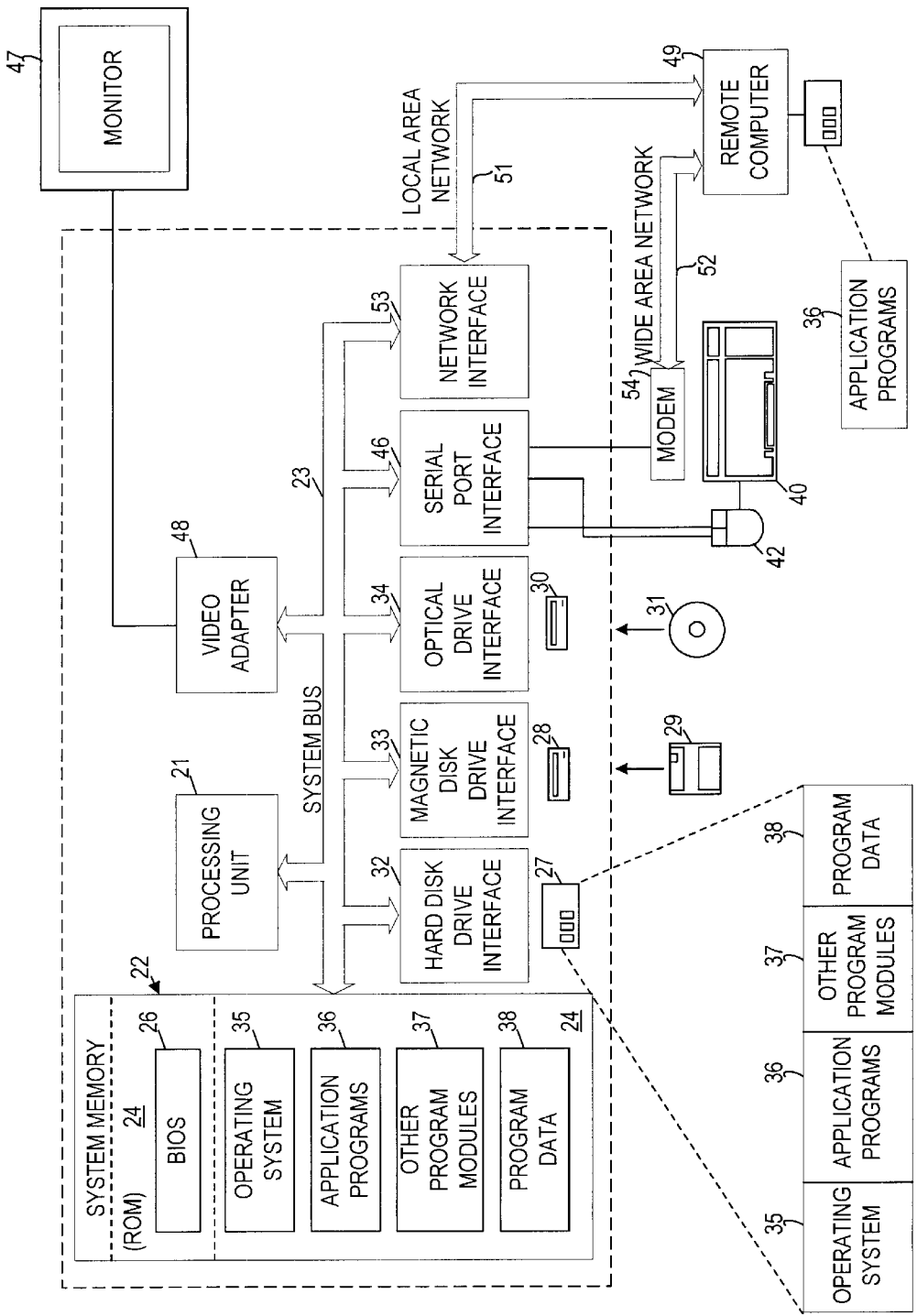
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Intermediate Language Environment

Figure 2:
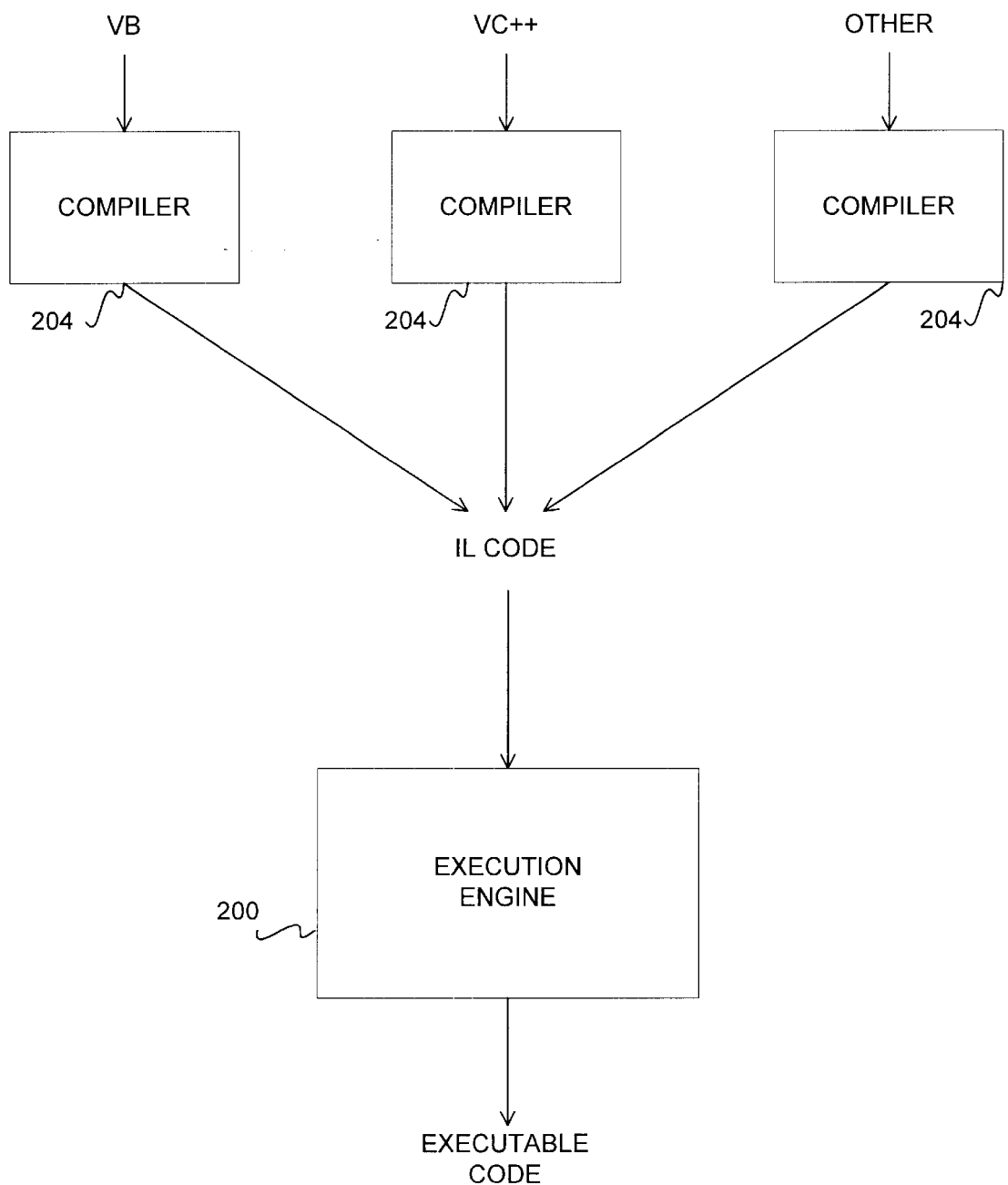
FIG. 2 is a diagram of an intermediate language environment according to an embodiment of the invention, of which a part thereof can be implemented within a system or a device, according to an embodiment of the invention.

In this section, description is provided of an overview of an intermediate language environment, according to one embodiment of the invention. Referring to FIG. 2, a diagram of an intermediate language environment according to an embodiment of the invention is shown. The environment of FIG. 2 includes an execution engine 200. Multiple source code language sources, such as Visual Basic (VB), Visual C++ (VC++), and other sources, are compiled by compilers such as compilers 204, into intermediate language (IL) code. The execution engine 200 then compiles, interprets, or just-in-time compiles, via a mechanism such as a compiler, interpreter, or just-in-time compiler, the IL code into executable code (based on the intermediate code) native to a particular platform, and then executes this executable code. The executable code is also referred to as native code. That is, the execution engine 200 translates the intermediate code to the executable code for execution, and executes the native code. Furthermore, in one embodiment, the execution engine 200 includes a mechanism to generate a native size-definite variable corresponding to an IL size-indefinite variable, as described in further sections of the detailed description.

Each of the compilers 204, the execution engine 200, and the constituent parts of the execution engine can in one embodiment be a computer program executed by a processor from a computer-readable medium such as a memory. Compilers such as compilers 204 are known within the art. Furthermore, available compilers that compile source code languages such as C, Visual Basic, etc., to native code, are modifiable to instead generate intermediate language code. Each of the multiple source code language source, the IL code, and the executable code can in one embodiment be stored as data on a computer-readable medium, such as a memory or a hard disk drive. The invention is not so limited, however.

It is noted that the execution engine 200 is desirably based on the specific underlying machine platform on which it is run—that is, including information about the underlying machine platform on which it is run. This enables the mechanism that generates a native code size-definite variable corresponding to an IL code size-indefinite variable to base its decision on the underlying machine platform.

In one embodiment, the execution engine 200 is part of a system that does not include the compilers 204, such that the compilers 204 pre-compile the source code into IL code, which is then, for example, stored on a computer-readable medium within the system. As another example, the IL code is received by the system, and is converted to native code and run. In another embodiment, the execution engine and its constituent parts are part of a device, such as the computer described in the preceding section of the detailed description. Other devices amenable to the invention include: a set-top box for a television, a hand-held device, a television set, a consumer electronics device, a laptop computer, a hand-held computer, an appliance, a desktop computer, and an automotive electronics device. The invention is not so limited. Such devices typically include a processor and a machine-readable medium such as a memory, such that the execution engine 200 and its constituent parts are executed by the processor from the medium.

Overview

In this section of the detailed description, an overview of how at least some embodiments of the invention work is described. This description provides a foundation for understanding methods and systems of different embodiments of the invention that are presented in the following sections of the detailed description. The overview is described with reference to FIGS. 3 and 4.

Figure 3:
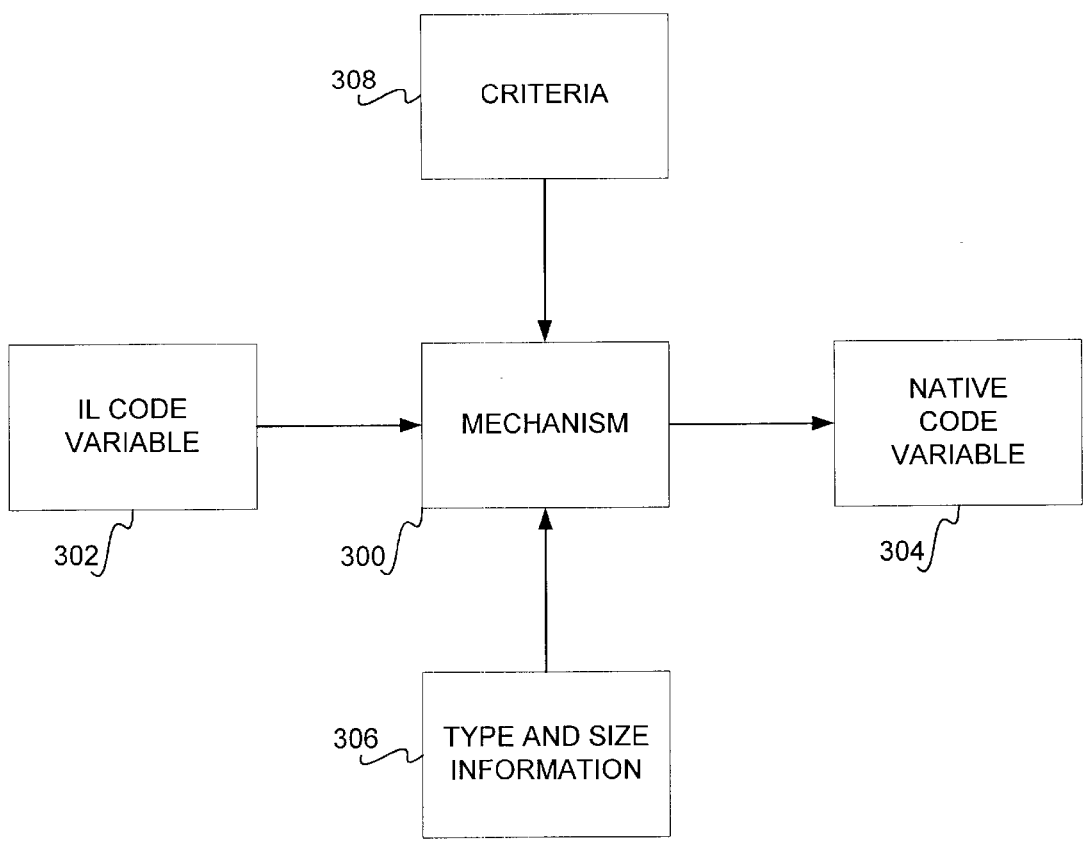
FIG. 3 is a diagram illustrating the operation of one embodiment of the invention.

Referring first to FIG. 3, a diagram illustrating the operation of one embodiment of the invention is shown. A mechanism 300, such as may be a part of the execution engine 200 of FIG. 2, inputs an IL code having an IL variable 302 (for example, from a computer-readable medium), such as a size-indefinite variable. The size-indefinite variable is specified as being size indefinite at the time the source code from which the IL code is compiled is written; that is, the programmer makes the decision to specify a variable as size-indefinite. The mechanism 300 generates native code corresponding to the IL code, including a native variable 304 corresponding to the variable 302, such as a size-definite variable corresponding to an IL size-indefinite variable. The IL code itself is compiled from a source code, not shown in FIG. 3. Furthermore, once generated, the native code may be output. In one embodiment, outputting the native code is defined as executing the native code. The remainder of the description of this overview presumes that the IL code variable 302 is size-indefinite—that is, it has a data type not of a fixed size—such that the native code variable 304 has a size determined by the mechanism 300. The mechanism 300 in one embodiment is a computer program (or a part thereof) executed by a processor from a computer-readable medium, although the invention is not so limited.

The IL code variable 302 may have any type of data type; the invention is not so limited. For example, the variable 302 may be a size-indefinite integer, a size-indefinite unsigned integer (which may be a pointer), and a size-indefinite real (also referred to as a floating point). The mechanism 300 determines the size of the variable 302 by referring to the information 306 that includes size information of the variable 302. That is, the information 306 specifically delineates the size of the variable 302.

In one embodiment, the information 306 is part of what is referred to as a signature file. The signature file includes specific information for a method of an object class of a computer program represented by the IL code. The term object class is known within the art, and refers generally in the context of object-oriented programming as a specific definition of a class of objects, from which specific objects can be instantiated therefrom. An object is generally opaque, such that other objects can only access the object through one or more methods of the object, which ask the object to perform a particular functionality defined by each method. Each method in turn generally has one or more local variables, such as the variable 302. Thus, a signature file contains information regarding a particular method. This information may include, for example, the information 306, which delineates the size of the variable 302.

Thus, by referring to the information 306, the mechanism 300 is able to determine if the variable 302 has its size already defined (such as a 32-bit integer, a 64-bit real, etc.), or, as has been presumed, if the size is indefinite (such as a size-indefinite integer, etc.). If the size is indefinite, the mechanism 300 further refers to the criteria 308 to determine the size the corresponding native code variable 304 should be.

In one embodiment, this criteria 308 is machine-specific and relates to the architecture of the system on which the native code is to be executed. For example, for a typical x86-type processor, the criteria 308 may specify that every size-indefinite variable is to be resolved into a 32-bit variable, while for a DEC Alpha processor, the criteria 308 may specify that every size-indefinite variable is to be resolved into a 64-bit variable. The invention is not limited to a particular criteria 308, however.

For example, a particular criteria 308 can specify that every size-indefinite variable be resolved into the largest size possible variable. Alternatively, the criteria 308 can specify that size-indefinite integer variables, for example, be resolved into one size, while size-indefinite floating point variables be resolved into another size.

In this manner, then, the mechanism 300 is able to generate a definite-size native code variable 304 corresponding to an indefinite-size IL code variable 302. The mechanism 300 uses the size information 306 to determine that the IL code variable 302 is of indefinite size. Then, the mechanism 300 uses the criteria 308 to determine the size of the corresponding native code variable 304. The mechanism 300 finally generates the definite-size native code variable 304.

An example is illustrative in further understanding embodiments of the invention. Consider an IL code representation of the source code "var x int," specifying a variable of type integer. It is noted that the source code itself does not specify the size of the integer—that is, it does not specify a "short" or a "long" for example, which may correspond to a short integer and a long integer, respectively. Thus, when the execution engine compiles or interprets the variable x into native code, it needs to resolve the size of this integer. If the execution engine operates on a 32-bit platform, for example, it may have an inherent criteria to specify that all size-indefinite variables, including size-indefinite integers, be resolved into 32-bit variables of their corresponding type. Therefore, the variable x would be resolved into a 32-bit integer. If the execution engine operates on a 64-bit platform, conversely, it may have an inherent criteria to specify that only size-indefinite unsigned variables are to be resolved into 64-bit unsigned variables, and that all other size-indefinite variables are still to be resolved into 32-bit variables of their corresponding type. In this latter example as well, the variable x would be resolved into a 32-bit integer. However, as has been stated, the invention is not limited to a particular criteria for resolving size-indefinite variables.

Figure 4:
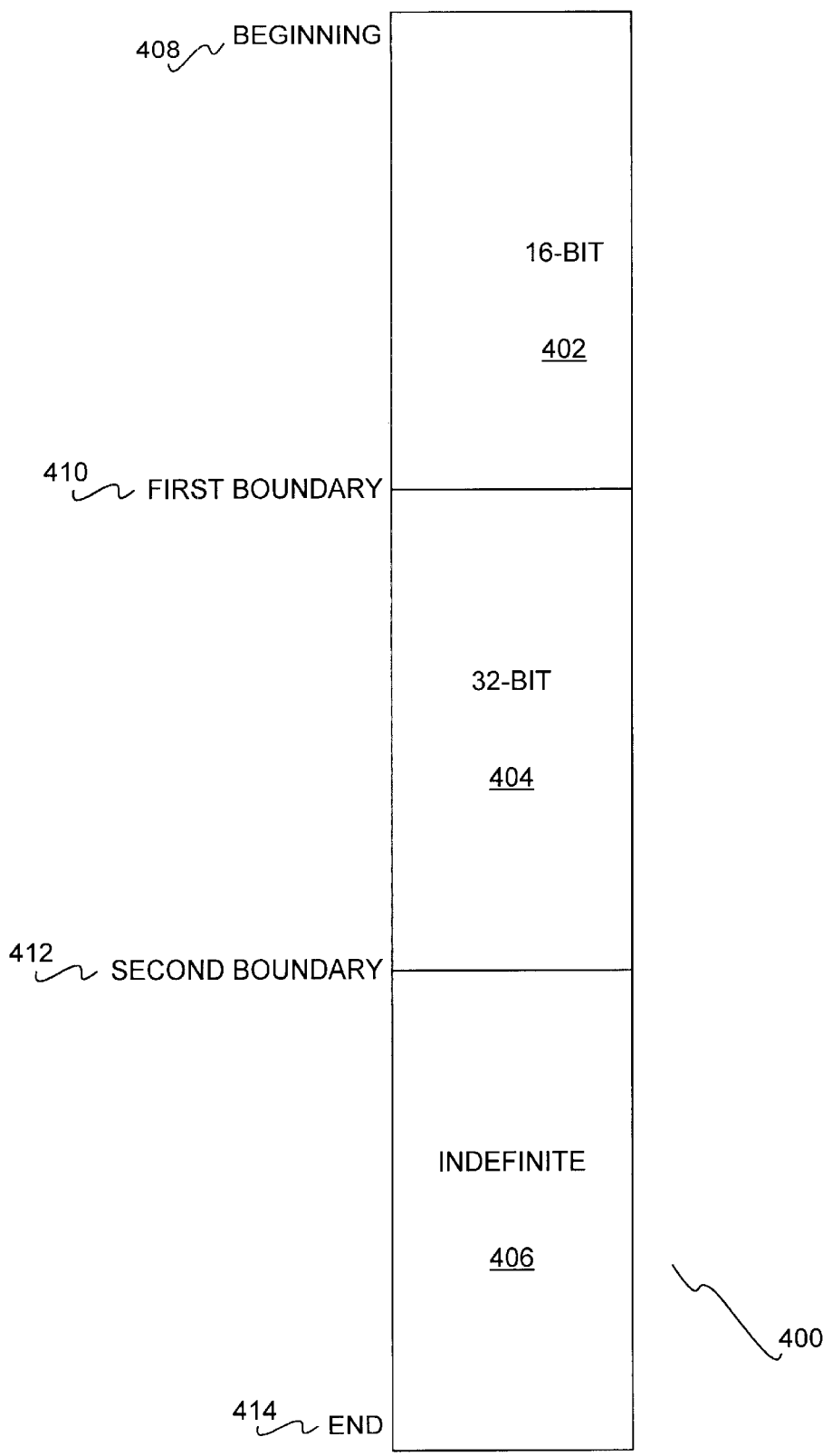
FIG. 4 is a diagram illustrating more specifically how the size of an intermediate language variable is determined, according to one embodiment of the invention; and, FIG. 5 is a flowchart according to an embodiment of the invention.

Referring to FIG. 4, a diagram illustrating more specifically how the size of an intermediate language variable is determined, according to one embodiment of the invention, is shown. A list of variables 400 that is sorted in length from smallest-size variables to largest-size variables to size-indefinite variables is generated as part of the compilation process from source code to IL code, such that the list 400 is part of the IL code that is passed along to the execution engine. In other words, the list 400 is the size information 306 of FIG. 3 relied upon by the mechanism 300 of FIG. 3 in one embodiment. The invention is not so limited, however.

The list 400 as shown in FIG. 4 thus includes 16-bit (or, "short") variables 402, 32-bit (or, "long") variables 404, and indefinite-size variables 406. The list 400 has a beginning 408 and an end 414, as well as a first boundary 410 separating the 16-bit variables 402 from the 32-bit variables 404, and a second boundary 412 separating the 32-bit variables 404 from the indefinite-size variables 406.

In one embodiment, the size of an IL variable is determined with respect to this list as is now described. The information passed along with the IL code with respect to the list 400 (as generated during the generation of the IL code itself) includes the total number of variables in the list 400 such that, for example, an array variables[beginning= 1 . . . end=total number of variables] specifies the list. The information passed along with the IL code also includes the number of 16-bit variables 402 within the list 400, such that the variables variables[beginning . . . first boundary=number of 16-bit variables] specify the 16-bit variables. The information passed along with the IL code in addition includes the number of 32-bit variables 404 within the list 400, such that the variables variables[first boundary+1 . . . second boundary=first boundary+number of 32-bit variables] specify the 32-bit variables. Thus, the variables [second boundary+1 . . . end] specify the size-indefinite variables. Finally, the information passed along with the IL code includes the list number of each variable, such that variables [list number of a particular variable] specifies the particular variable.

Having this information thus allows the size of a particular variable to be easily determined, in the case where the list number of the particular variable is known—as is the case where the information passed along with the IL code also includes the list number of each variable. For example, there may be 10 total variables in a method, including 5 16-bit variables and 3 32-bit variables. Thus, a variable having a list number less than or equal to 5 means that the variable is 16-bit. A variable having a list number greater than 5 but less than or equal to 8 means that the variable is 32-bit (where the 8 is determined by adding the 5 16-bit variables and the 3 32-bit variables). Finally, a variable having a list number greater than 8 means that the variable is size-indefinite. In other words, referencing the location of a particular variable against the variable-size boundaries of the variables list easily determines the size of the particular variable in this embodiment.

Methods

In this section of the detailed description, computer-implemented methods according to varying embodiments of the invention are described. The computer-implemented methods can be realized at least in part as one or more programs running on a computer (such as the computer of FIG. 1)—that is, as a program executed from a computer-readable medium such as a memory by a processor of a computer. The programs are desirably storable on a machine-readable medium such as a floppy disk or a CD-ROM, for distribution and installation and execution on another computer.

Figure 5:
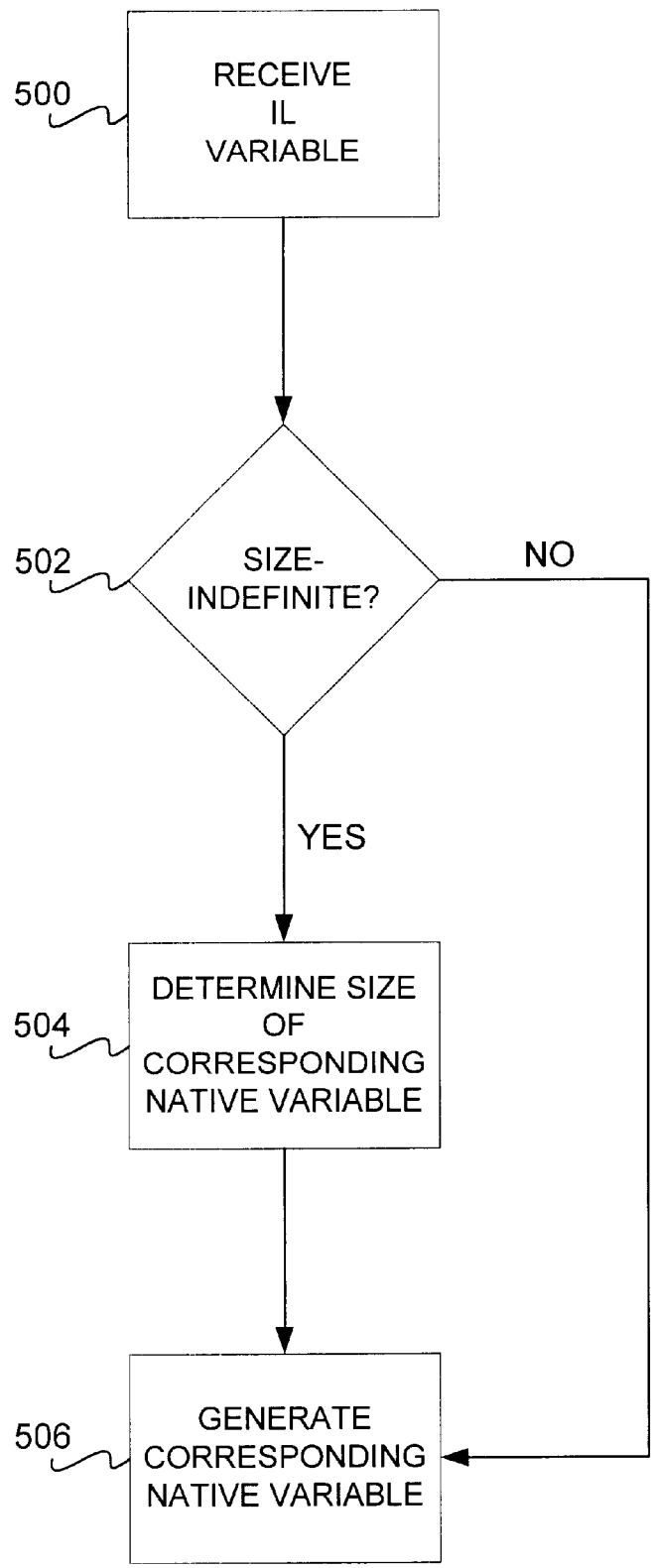

Referring to FIG. 5, a computer-implemented method according to an embodiment of the invention is shown. In 500, an IL variable is input, for example, as part of inputting an IL code. The manner by which the IL code is input is not limited by the invention. For example, the IL code can be received from over the Internet, or read from a computer-readable medium, such as a hard disk drive or a non-volatile memory.

In 502, it is determined whether the IL variable received in 500 is size-indefinite. In one embodiment, this determination is made as has been described in previous sections of the detailed description—for example, by referring to information passed along with the IL code, such as information regarding a list of the variables as has been described. If the IL variable has an indefinite size, then the method proceeds to 504; otherwise, the method proceeds to 506.

In 504, the indefinite-size variable is resolved into a definite-size variable. That is, the size of a corresponding native variable to the IL variable is determined. In one embodiment, this is accomplished according to a machine-specific criteria, as has been described in previous sections of the detailed description. For example, if the platform is an x86-type platform, then size-indefinite variables may be resolved into 32-bit-sized variables. However, the invention is not so limited.

Finally, in 506, the corresponding native variable to the IL variable is generated, for example, as part of generating the native code corresponding to the IL code. Where 506 is proceeded to from 502, the size of the native variable is dictated by the size of the IL variable received in 500. Where 506 is proceeded to from 504, the size of the native variable is dictated by the determination made in 504.

As can be appreciated by those of ordinary skill within the art, a method according to an embodiment of the invention can include other parts not shown in the specific method of FIG. 5. For example, the compilation of IL code from source code, including the generation of information used to determine whether an IL variable has a definite-size or not, can be performed prior to 500. As another example, after 506, the native code generated can be output, where in one embodiment outputting the native code includes executing the code on the platform on which it was meant to be run. The invention is not so limited, however.

As those of ordinary skill within the art can also appreciate, one or more parts of the method of FIG. 5 can be executed by a component of the intermediate language environment as described in conjunction with FIG. 2. For example, within a system, a mechanism such as a just-in-time compiler may translate the intermediate-language code to native code, including generating a definite-size native variable corresponding to an indefinite-size IL variable. As another example, within a device, a mechanism may be executed by a processor from a computer-readable medium to generate a definite-size native variable corresponding to an indefinite-size IL variable. The invention is not so limited, however.

Hardware Implementation

As described in this application thus far, embodiments of the invention have been described as applicable to a primarily software environment. However, as those of ordinary skill within the art can appreciate, the invention is not so limited. For example, intermediate language (IL) code having a size-indefinite variable can in another embodiment be input directly into a hardware-only mechanism, such as one or more integrated circuits (IC's), or "chips," which generates native code based on the IL code and executes the native code. In such an implementation, the hardware-only mechanism would have built-in criteria, for example, that resolves size-indefinite variables to size-definite variables based on its own architecture. In other words, the hardware-only mechanism is in practical effect a special-purpose execution engine implemented in hardware. The designers of such a mechanism specify the criteria as to how the size-indefinite variables are to be translated into size-definite variables. For example, in the context of a 32-bit hardware mechanism, all size-indefinite variables could be translated into 32-bit variables. As another example, size-indefinite integers may be translated into 32-bit integers, while size-indefinite pointers may be translated into 64- or 128-bit pointers.

Furthermore, in one particular hardware implementation, the hardware-only mechanism may not have a "native code" per se, since the hardware itself can be designed such that the intermediate language code is the "native" code for the hardware. That is, the hardware does not need to translate intermediate language code to native code for execution, because the intermediate language code is itself executable on the hardware. In this instance, though, the hardware still needs to translate size-indefinite variables into size-definite variables. Therefore, the hardware-only mechanism as described herein directly executes intermediate language code, with the caveat that any size-indefinite variables must first be translated into size-definite variables.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:
inputting an intermediate-language code having a size-indefinite variable
generating a native code based on the intermediate-language code, including generating a size-definite variable corresponding to the size-indefinite variable according to at least one machine-specific criterion; and
outputting the native code, wherein
generating the native code further comprises receiving a location of a variable within an ordered list of variables of the intermediate-language code, an order of the ordered list being based on a length of the variables to size-indefinite variables, and determining whether the variable comprises a size-indefinite variable by referencing the location of the variable against variable-size boundaries of the list.

2. The method of claim 1, further initially comprising compiling a source code to the intermediate-language code.

3. The method of claim 1, wherein inputting an intermediate-language code having a size-indefinite variable comprises inputting an intermediate-language code having a size-indefinite variable selected from the group comprising: a size-indefinite integer, a size-indefinite unsigned integer, and a size-indefinite real.

4. The method of claim 1, wherein generating a native code based on the intermediate-language code, including generating a size-definite variable corresponding to the size-indefinite variable according to the at least one machine-specific criterion, comprises generating the size-definite variable according to the at least one machine-specific criterion selected from the group comprising an architecture of a system on which the code is to be executed.

5. The method of claim 1, wherein outputting the native code comprises executing the native code.

6. The method of claim 1, wherein inputting an intermediate-language code comprises inputting the code from a computer-readable medium.

7. A computer-implemented method comprising:
receiving a variable of an intermediate-language code;
determining whether the variable comprises a size-indefinite variable; and
upon determining that the variable comprises a size-indefinite variable, generating a size-indefinite variable in a native code corresponding to the size-indefinite variable, according to a machine-specific criteria, wherein
receiving a variable of an intermediate-language code further comprises receiving a location of the variable within a list of variables of the intermediate-language code sorted by length from smallest-size variables to largest-size variables to size-indefinite variables, and determining whether the variable comprises a size-indefinite variable comprises referencing the location of the variable against variable-size boundaries of the list.

8. The method of claim 7, further initially compiling a source code to the intermediate-language code, including generating the list.

9. A device comprising:
a compiler to compile an intermediate-language code into a native code;
an execution engine to execute the native code; and
a mechanism to determine whether a variable of the intermediate language code comprises a size-indefinite variable, and upon determining that the variable comprises a size-indefinite variable, generating a native-code size-definite variable corresponding to the size-indefinite variable according to a machine specific criteria, wherein
the intermediate-language code includes a list of variables sorted from smallest-size variables to largest-size variables to size-indefinite variables such that the variable has a location within the list, and the mechanism is to determine whether the variable comprises a size-indefinite variable by referencing the location of the variable against variable-size boundaries of the list.

10. A machine-readable medium having instructions stored thereon for execution by a processor to perform a method comprising:
receiving a variable of an intermediate-language code;
determining whether the variable comprises a size-indefinite variable; and
upon determining that the variable comprises a size-indefinite variable, generating a size-definite variable in a native code corresponding to the size-indefinite variable according to a machine-specific criteria, wherein
receiving a variable of an intermediate-language code further comprises receiving a location of the variable within a list of variables of the intermediate-language code sorted by length from smallest-size variables to largest-size variables to size-indefinite variables, and determining whether the variable comprises a size-indefinite variable comprises referencing the location of the variable against variable-size boundaries of the list.

11. A computer-implemented method comprising:
receiving a variable of an intermediate-language code;
determining whether the variable comprises a size-indefinite variable; and
upon determining that the variable comprises a size-indefinite variable, generating a size-indefinite variable in a native code corresponding to the size-indefinite variable, according to at least one machine-specific criterion, wherein
receiving a variable of an intermediate-language code further comprises receiving a location of the variable within an ordered list of variables of the intermediate-language code, an order of the ordered list being based on a length of the variables to size-indefinite variables, and determining whether the variable comprises a size-indefinite variable comprises referencing the location of the variable against variable-size boundaries of the list.

12. A device comprising:
a compiler to compile an intermediate-language code into a native code;
an execution engine to execute the native code; and
a mechanism to determine whether a variable of the intermediate language code comprises a size-indefinite variable, and upon determining that the variable comprises a size-indefinite variable, generating a native-code size-definite variable corresponding to the size-indefinite variable according to at least one machine specific criterion, wherein
the intermediate-language code includes an ordered list of variables, an order of the ordered list being based on a length of the variables to size-indefinite variables such that the variable has a location within the list, and the mechanism is to determine whether the variable comprises a size-indefinite variable by referencing the location of the variable against variable-size boundaries of the list.

13. A machine-readable medium having instructions stored thereon for execution by a processor to perform a method comprising:

receiving a variable of an intermediate-language code;

determining whether the variable comprises a size-indefinite variable; and upon determining that the variable comprises a size-indefinite variable, generating a size-definite variable in a native code corresponding to the size-indefinite variable according to at least one machine-specific criterion, wherein receiving a variable of an intermediate-language code further comprises receiving a location of the variable within an ordered list of variables of the intermediate-language code, the ordered list being ordered based on a length of the variables to size-indefinite variables, and determining whether the variable comprises a size-indefinite variable comprises referencing the location of the variable against variable-size boundaries of the list.

14. A machine-readable medium having instructions stored thereon for execution by a processor to perform a method comprising:

receiving a variable of an intermediate-language code;

determining whether the variable comprises a size-indefinite variable; and upon determining that the variable comprises a size-indefinite variable, generating a size-definite variable in a native code corresponding to the size-indefinite variable according to at least one machine-specific criterion, wherein receiving a variable of an intermediate-language code further comprises receiving a location of the variable within a list of variables of the intermediate-language code sorted by length from smallest-size variables to largest-size variables to size-indefinite variables, and determining whether the variable comprises a size-indefinite variable comprises referencing the location of the variable against variable-size boundaries of the list.

* * * * *